United States Patent
Wang et al.

(10) Patent No.: US 12,516,191 B2
(45) Date of Patent: Jan. 6, 2026

(54) ISOCYANURATE-CONTAINING POLYISOCYANATE COMPOSITION WITH STABLE CHROMATICITY, AND PREPARATION METHOD THEREOF

(71) Applicants: WANHUA CHEMICAL GROUP CO., LTD., Shandong (CN); WANHUA CHEMICAL (NINGBO) CO., LTD., Zhejiang (CN)

(72) Inventors: Nuancheng Wang, Shandong (CN); Yonghua Shang, Shandong (CN); Bin Shi, Shandong (CN); Yuqi Wang, Shandong (CN); Lidong Sun, Shandong (CN); Weijing Fan, Shandong (CN); Chengyue Yan, Shandong (CN)

(73) Assignees: WANHUA CHEMICAL GROUP CO., LTD., Shandong (CN); WANHUA CHEMICAL (NINGBO) CO., LTD., Zhejiang (CN)

( * ) Notice: Subject to any disclaimer, the term of this patent is extended or adjusted under 35 U.S.C. 154(b) by 419 days.

(21) Appl. No.: 18/043,148

(22) PCT Filed: Sep. 25, 2020

(86) PCT No.: PCT/CN2020/117705
§ 371 (c)(1),
(2) Date: Feb. 27, 2023

(87) PCT Pub. No.: WO2022/061705
PCT Pub. Date: Mar. 31, 2022

(65) Prior Publication Data
US 2024/0034881 A1 Feb. 1, 2024

(51) Int. Cl.
C08L 79/08 (2006.01)
C08G 18/09 (2006.01)
C08G 18/10 (2006.01)
C08G 18/18 (2006.01)

(52) U.S. Cl.
CPC ............ *C08L 79/08* (2013.01); *C08G 18/092* (2013.01); *C08G 18/10* (2013.01); *C08G 18/1825* (2013.01); *C08G 2115/02* (2021.01)

(58) Field of Classification Search
CPC ........ C08L 79/08; C08G 18/092; C08G 18/10
See application file for complete search history.

(56) References Cited

U.S. PATENT DOCUMENTS

| | | |
|---|---|---|
| 5,144,031 A | 9/1992 | Pedain |
| 5,859,294 A | 1/1999 | Hashimoto et al. |
| 5,914,383 A | 6/1999 | Richter et al. |
| 2002/0120089 A1 | 8/2002 | Kohlstruk et al. |
| 2013/0109806 A1 | 5/2013 | Schaefer et al. |
| 2014/0058102 A1 | 2/2014 | Halpaap et al. |
| 2017/0008995 A1 | 1/2017 | Richter |
| 2018/0244826 A1 | 8/2018 | Richter |
| 2018/0327538 A1 | 11/2018 | Lomlder et al. |
| 2020/0123300 A1 | 4/2020 | Liu et al. |
| 2023/0023659 A1 | 1/2023 | Richter et al. |

FOREIGN PATENT DOCUMENTS

| | | |
|---|---|---|
| CA | 2244486 A1 | 2/1999 |
| CN | 1123271 A | 5/1996 |
| CN | 101356153 | 1/2009 |
| CN | 101547950 A | 9/2009 |
| CN | 105107503 A | 12/2015 |
| CN | 107827832 | 3/2018 |
| CN | 109651279 A | 4/2019 |
| CN | 110305294 A | 10/2019 |
| CN | 110372846 A | 10/2019 |
| CN | 110790880 A | 2/2020 |
| CN | 111247185 | 6/2020 |
| CN | 111303373 A | 6/2020 |
| CN | 112225857 | 1/2021 |
| CN | 112250835 | 1/2021 |
| DE | 102006043464 A1 | 4/2007 |
| EP | 0769492 A1 | 4/1997 |
| EP | 0947531 | 10/1999 |
| EP | 1331233 A1 | 7/2003 |

(Continued)

OTHER PUBLICATIONS

PCT Search Report prepared for PCT Application No. PCT/CN2020/117705, completed Jun. 15, 2021.

(Continued)

*Primary Examiner* — Michael L Leonard
(74) *Attorney, Agent, or Firm* — Barnes & Thornburg LLP

(57) ABSTRACT

The present invention provides an isocyanurate-containing polyisocyanate composition with stable chromaticity, and a preparation method thereof, belonging to the technical field of polyisocyanate composition preparation. The preparation method comprises: an isocyanate monomer being polymerized in the presence of a catalyst, after the reaction is terminated, obtaining a prepolymer, subjecting the prepolymer to separation treatment and heat treatment, and obtaining the polyisocyanate composition containing isocyanurate; based on the weight of the polyisocyanate composition, the cleavable amine content of the polyisocyanate composition is less than or equal to 20 ppm. By means of controlling the cleavable amine content of the polyisocyanate composition, the present invention causes the resulting isocyanurate-containing polyisocyanate composition to have stable storage chromaticity, and the present invention has a chrominance increase of ≤10 Hazen when stored at 40° C. for 12 months.

15 Claims, No Drawings

(56) References Cited

FOREIGN PATENT DOCUMENTS

| | | |
|---|---|---|
| EP | 3476826 A1 | 5/2019 |
| EP | 3838939 A1 | 6/2021 |
| FR | 2770532 A1 | 5/1999 |
| JP | 11302351 A | 11/1999 |
| JP | 2002241458 A | 8/2002 |
| JP | 2011246569 | 12/2011 |
| JP | 2015172164 A | 10/2015 |
| JP | 2015199917 | 11/2015 |
| JP | 2017222812 A | 12/2017 |
| WO | 2009073093 A2 | 6/2009 |
| WO | 2019078250 A1 | 4/2019 |
| WO | 2020207892 A1 | 10/2020 |

OTHER PUBLICATIONS

Chinese Supplemental Search Report with English Translation issued for Application No. 2020110207687, mailed Mar. 18, 2022.
European Search Report issued for Application No. 20954557.3, mailed Feb. 2, 2024.
Japanese Office Action with English Translation issued for Application No. 2023-503079, mailed Feb. 22, 2024.
Chinese Office Action with English Translation issued for Application No. 202011020768.7, mailed Dec. 2, 2021.

ISOCYANURATE-CONTAINING POLYISOCYANATE COMPOSITION WITH STABLE CHROMATICITY, AND PREPARATION METHOD THEREOF

CROSS-REFERENCE TO RELATED APPLICATIONS

This application is a national stage entry under 35 U.S.C. § 371 (b) of PCT International Application No. PCT/CN2020/117705, filed Sep. 25, 2020, the entire disclosure of which is incorporated herein by reference.

TECHNICAL FIELD

The present application belongs to the technical field of isocyanates, and especially relates to an isocyanurate-containing polyisocyanate composition with stable chromaticity and a preparation method thereof.

BACKGROUND

Aliphatic diisocyanate has irreplaceable advantages in preparing anti-yellowing coatings and coatings and is widely used in coating industry. However, as a monomer, the low vapor pressure of aliphatic isocyanate limits its application. Therefore, it is more common to convert aliphatic isocyanate into polyisocyanate by polymerization to increase the tolerance during processing and further give products with excellent performance.

Due to its excellent performance such as weather resistance, wear resistance and corrosion resistance, polyisocyanate is widely used in coatings, adhesives and elastomers, especially in paint industry, including the most widely used isocyanurate-containing polyisocyanate curing agent.

U.S. Pat. Nos. 4,040,992, 4,288,586, 4,419,513, 673,062, 6,800,714 and 7,001,973 have reported the synthesis of isocyanurate-containing polyisocyanate composition by using quaternary ammonium salt or quaternary ammonium salt as the catalyst.

Due to the diversity of downstream application conditions, there are often high-temperature baking conditions or high-temperature storage requirements, which put forward higher requirements for the chromaticity stability of the polyisocyanate composition.

In the prior published patents, the research focuses on the quality improvement of the raw material diisocyanate, for example, reducing the impurities containing chlorine and bromine in isocyanate, such as hydrolyzed chlorine, monochloro products, dichloro products, products containing carbamoyl chloride, products containing carbamoyl bromide, etc.

Although the above methods can obviously improve the chromaticity stability of the prepared polyisocyanate composition, they can't fully meet the polyisocyanate requirement of downstream applications for higher chromaticity stability; at the same time, the process of treating impurities in high-activity isocyanate raw material is complicated, which is difficult to realize industrialization.

We found through extensive research that the catalyst is an important element of the preparation of the polyisocyanate composition, but its micro-component impurities or residual derivatives have a significant impact on the chromaticity stability of the prepared polyisocyanate derivatives. The prior art has also explored the catalysts used. For example, patents CN110372846 and CN110790880 obtain chromaticity-stable uretdione-containing isocyanate compositions and TDI trimers by controlling the content of secondary amine and secondary phosphine in the catalyst, respectively. However, they are limited to organophosphine catalysts and Mannich base catalysts, which lack effective guidance for the polyisocyanate compositions prepared from quaternary ammonium base or quaternary ammonium salt catalyst systems with wider application range.

SUMMARY

An object of the present application is to provide an isocyanurate-containing polyisocyanate composition with stable chromaticity, aiming at the quaternary ammonium base or quaternary ammonium salt catalyst system with wider application range in the current methods for preparing polyisocyanate compositions.

After a systematic study on the causes of the chromaticity increment of the isocyanurate-containing polyisocyanate composition during long-term storage, it is surprisingly found by the inventor that the main factors that lead to chromaticity increment of the isocyanurate-containing polyisocyanate composition during the long-term storage process include the residual impurities in the catalyst, the catalyst decomposition in the process and the catalyst residues in the polyisocyanate composition; this may be explained by the mechanism that in the processes of preparing the catalyst, preparing the polyisocyanate composition and storing the polyisocyanate composition, free amine compounds will be introduced or generated in the composition, and the free amine compounds will be easily oxidized into amine oxide substances to develop color, based on which the present application provides an implementable industrialization solution.

In order to achieve the above object, the present application adopts the technical solutions below.

The present application provides an isocyanurate-containing polyisocyanate composition with stable chromaticity, in which based on a total weight of the polyisocyanate composition, a cleavable amine content of the polyisocyanate composition is less than or equal to 20 ppm (for example, the cleavable amine content is 15 ppm, 12 ppm, 10 ppm, 8 ppm, 6 ppm, 4 ppm, 2 ppm, 1 ppm, 0.5 ppm and 0.05 ppm); the cleavable amine is the decomposition product of the catalyst used in the preparation of the isocyanurate-containing polyisocyanate composition.

The cleavable amine referred herein is the organic amine detected by the pyrolysis-GC-MS after the pyrolysis and small-molecule gasification of the catalyst residues in the polyisocyanate composition at high temperature.

The cleavable amine content of the polyisocyanate composition referred herein will generally be more than 0 or infinitely close to 0 because of its very low content.

In some preferred embodiments of the present application, the catalyst is a quaternary ammonium base and/or a quaternary ammonium salt. For example, the quaternary ammonium base may be selected from choline hydroxide, (2-hydroxyethyl)trimethylammonium hydroxide, tetramethylammonium hydroxide, tetraethylammonium hydroxide, tetrapropylammonium hydroxide, tetrabutylammonium hydroxide, benzyltrimethylammonium hydroxide, 1-adamantylammonium hydroxide, and hexamethonium hydroxide. For example, the quaternary ammonium salt may be selected from a tetraalkylammonium salt of organic weak acid, a hydroxypropyltrimethylammonium salt of organic weak acid (for example, hydroxypropyltrimethylammonium formate, hydroxypropyltrimethylammonium acetate, hydroxypropyltrimethylammonium octanoate and hydroxypropyltrimethylammonium decanoate), and a hydroxyethyltrimethylammonium salt of organic weak acid (for example, hydroxyethyltrimethylammonium formate, hydroxyethyltrimethylammonium acetate or hydroxyethyltrimethylammonium decanoate).

The tetraalkylammonium referred herein may be selected from, but not limited to, tetramethylammonium and tetraethylammonium; the organic weak acid referred herein may be selected from, but not limited to, formic acid, acetic acid and decanoic acid. For example, the tetraalkylammonium salt of organic weak acid may be selected from tetramethylammonium formate, tetramethylammonium acetate, tetramethylammonium decanoate, tetramethylammonium formate, tetramethylammonium acetate or tetramethylammonium decanoate.

In some embodiments of the present application, the cleavable amine is one or more of trimethylamine, triethylamine, tripropylamine and tributylamine.

In some preferred embodiments, the catalyst is selected from one or more of choline hydroxide, (2-hydroxyethyl) trimethylammonium hydroxide, tetramethylammonium hydroxide, tetraethylammonium hydroxide, tetrapropylammonium hydroxide, tetrabutylammonium hydroxide, benzyltrimethylammonium hydroxide, 1-adamantylammonium hydroxide, hexamethonium hydroxide, a tetraalkylammonium salt of organic weak acid (the tetraalkylammonium salt of organic weak acid may be selected from tetramethylammonium formate, tetramethylammonium acetate, tetramethylammonium decanoate, tetramethylammonium formate, tetramethylammonium acetate or tetramethylammonium decanoate), hydroxypropyltrimethylammonium formate, hydroxypropyltrimethylammonium acetate, hydroxypropyltrimethylammonium octanoate, hydroxypropyltrimethylammonium decanoate, hydroxyethyltrimethylammonium formate, hydroxyethyltrimethylammonium acetate and hydroxyethyltrimethylammonium decanoate, preferably, tetraethylammonium hydroxide and/or hydroxypropyltrimethylammonium octanoate.

In some embodiments of the present application, the polyisocyanate composition has a chromaticity increment of less than or equal to 10 Hazen after stored at 40° C. for 12 months (for example, the chromaticity increment of the polyisocyanate composition is 8 Hazen, 6 Hazen, 4 Hazen, 1 Hazen, 0.5 Hazen, 0.1 Hazen), preferably, less than or equal to 5 Hazen.

For the term "chromaticity", see the color determination method in GB/T 3143-1982. The chromaticity increment refers to the absolute chromaticity difference of the polyisocyanate composition before and after storage (storage at 40° C./12 months). For example, the chromaticity increment can be more than or equal to 0, or infinitely close to 0 because the chromaticity increment is extremely small.

Another object of the present application is to provide a preparation method of the isocyanurate-containing polyisocyanate composition with stable chromaticity.

A preparation method of the isocyanurate-containing polyisocyanate composition includes the following steps:
(1) reacting an isocyanate monomer in the presence of the catalyst; preferably, the catalyst is a quaternary ammonium base and/or a quaternary ammonium salt;
(2) adding a terminator into the system to terminate the reaction when the reaction reaches a target conversion rate, so as to obtain a prepolymer;
(3) subjecting the product obtained in step (2) to separation treatment to remove the unreacted isocyanate monomer to obtain a crude isocyanurate-containing polyisocyanate composition;
or the product obtained in step (2) is not subjected to separation and treatment of removing the unreacted isocyanate monomer to obtain a crude isocyanurate-containing polyisocyanate composition;
(4) subjecting the crude polyisocyanate composition obtained in step (3) to heat treatment under high temperature and reduced pressure to obtain the isocyanurate-containing polyisocyanate composition with stable chromaticity.

In the present application, the catalyst can be a quaternary ammonium base/quaternary ammonium salt catalyst widely reported in the field and most widely used in industry.

The catalyst of the present application can be added into the reaction system as a pure substance, or optionally being dissolved in alcohol at any concentration for use. In some embodiments, the catalyst in step (1) is added in a form of an alcohol solution; in some preferred embodiments, a mass concentration of the catalyst is 0.25-50% in the alcohol solution (for example, 1%, 5%, 10%, 20% and 40%).

In an embodiment, as a diluent of the catalyst in step (1), the alcohol may be, but is not limited to, monohydric alcohol and/or dihydric alcohol. Preferably, the alcohol is selected from one or more of C1-C10 aliphatic alcohol, aralipatic alcohol, aromatic alcohol, aliphatic phenol, aralipatic phenol and aromatic phenol. The monohydric alcohol preferably has a form of linear, branched or cyclic alcohol or phenol; the dihydric alcohol may be, but is not limited to, for example, ethylene glycol, 1,3-propanediol, 1,2-propanediol, 1,3-butanediol, 1,4-butanediol, 2,3-butanediol, 1,5-pentanediol, 1,2-pentanediol, 1,3-pentanediol, 1,4-pentanediol, neopentyl glycol, 1,6-hexanediol, 1,7-heptanediol, 1,8-octanediol, 1,9-nonanediol, 1,10-decanediol, diethylene glycol, polyethylene glycol, polypropylene glycol, polytetramethylene glycol, 2-methyl-1,3-propanediol, 3-methyl-1,5-pentanediol, 2-ethyl-1,3-hexanediol, 2-methyl-1,8-octanediol and 2,2-diethyl-1,3-propanediol.

In some embodiments, an amount of the catalyst used in step (1) is 0.001%-0.1% of a mass of the isocyanate monomer (for example, 0.005%, 0.01%, 0.04%, 0.06% and 0.08%), preferably 0.01%-0.05%. In the case where the catalyst is added in the form of an alcohol solution, the amount of the catalyst referred herein can be a solute amount in the alcohol solution.

In the present application, the isocyanate monomer in step (1) is used as a raw material, its preparation method is not important for the implementation of the preparation method of the present application, and the isocyanate monomer includes those prepared with or without phosgene or by any other methods, and includes aromatic and/or aliphatic (including alicyclic) organic isocyanate. Specifically, the organic isocyanate may be an aromatic or aliphatic diisocyanate containing an NCO group and 4-20 carbon atoms. In some embodiments, the isocyanate monomer is an aromatic or aliphatic diisocyanate containing an NCO group and 4-20 carbon atoms. In some preferred embodiments, the isocyanate monomer is selected from one or more of hexamethylene diisocyanate, isophorone diisocyanate, cyclohexyl dimethylene diisocyanate, xylylene diisocyanate, dicyclohexylmethane diisocyanate, norbornane dimethylene diisocyanate, cyclohexyl diisocyanate, lysine diisocyanate, tetramethyl xylylene diisocyanate, 2,4,4-trimethylhexamethylene diisocyanate, toluene diisocyanate, methylcyclohexyl diisocyanate, naphthalene diisocyanate, p-phenylene diisocyanate and diphenylmethane diisocyanate.

In step (1) of the present application, a catalyst reaction is performed with the presence of the catalyst; in some embodiments, a reaction temperature of the reaction in step (1) is 30-100° C. (for example, 35° C., 45° C., 60° C., 75° C. and 90° C.), preferably, 40-80° C.

In some embodiments, a terminator (i.e., catalyst poison) is added into the system to terminate the reaction when the reaction reaches a target conversion rate. The target conversion rate referred herein can be monitored, for example, by detecting the NCO content of the system. Different reaction systems have different requirements and limits on the target conversion rate. In the present application, the target conversion rate of the reaction system in step (2) may be, for example, 10-80% (for example, 20%, 30%, 40% and 60%).

In some embodiments, the terminator in step (2) is selected from an organic acid and/or an acylating agent, preferably, one or more of formic acid, benzoic acid, benzoyl chloride and diisooctyl phosphate.

In some embodiments, an amount of the terminator in step (2) is 100-150% of a catalyst molar amount (for example, 110%, 120%, 130% and 140%). It should be understood by those skilled in the art that different polymerization catalysts used in the reaction system will lead to different terminator amounts. In the reaction system of the present application, the amount of the terminator is measured by polymerization catalyst deactivation in the system.

To further reduce the cleavable amine content of the isocyanurate-containing polyisocyanate composition, a phosphate salt can be added into the prepolymer after terminating the reaction (for example, one or more of a potassium salt or a sodium salt containing dihydrogen phosphate and hydrogen phosphate). In some embodiments, step (2) further includes adding a phosphate salt into the prepolymer after terminating the reaction; the phosphate salt is preferably selected from one or more of potassium dihydrogen phosphate, sodium dihydrogen phosphate, potassium hydrogen phosphate and sodium hydrogen phosphate.

In some embodiments, a hydrogen molar amount in the phosphate salt is 50-100% of a catalyst molar amount (for example, 60%, 70%, 80% and 90%).

In some embodiments, step (2) includes stirring at 0-30° C. (for example, 5° C., 10° C., 15° C. and 20° C.) for 10-120 min (for example, 30 min, 60 min and 100 min) after adding the phosphate salt.

In an embodiment of the present application, in step (2), potassium dihydrogen phosphate is added into the prepolymer after the reaction is terminated, an amount of which is 50% of a molar amount of the catalyst (that is, the hydrogen molar amount of potassium dihydrogen phosphate is 100% of the catalyst molar amount), and after stirring thoroughly at 0° C. for 120 min, the subsequent processes such as filtration and unreacted monomer removal are carried out.

In some embodiments of the present application, in step (3), the product obtained in step (2) is subjected to the separation treatment by a thin-film evaporator to remove the unreacted isocyanate monomer. During the process of subjecting the materials to the thin-film evaporator, the materials can be preheated and then separated. In some embodiments, a preheating temperature is 50-100° C.; in some embodiments, a separation temperature is 90-180° C. and a separation vacuum degree is absolute pressure of 5-200 pa. In the crude isocyanurate-containing polyisocyanate composition obtained after separation, a content of the residual monomer is less than 0.4 wt % based on a mass of the polyisocyanate composition (for example, based on a mass of the polyisocyanate composition, a content of the residual monomer is 0.38 wt %, 0.35 wt %, 0.3 wt %, 0.2 wt %, 0.1 wt %, 0.05 wt % and 0.01 wt %).

In some embodiments of the present application, in step (4), a process condition of the heat treatment of the crude polyisocyanate composition under high temperature and reduced pressure includes treating the composition at a temperature of 90-180° C. (for example, 100° C., 120° C., 150° C. and 170° C.) and a pressure of less than or equal to 200 Pa (for example, 5 Pa, 10 Pa, 50 Pa, 100 Pa and 150 Pa) for 5-60 min, preferably, treating the composition at a temperature of 150-180° C. and a pressure of less than or equal to 20 Pa for 10-30 min.

In some preferred embodiments, after separation, the crude isocyanurate-containing polyisocyanate composition is directly subjected to heat treatment in step (4), so as to avoid secondary heating. In the treatment process, the quaternary ammonium cations of the catalyst undergo Hofmann elimination reaction, and the organic amine obtained by pyrolysis can be removed from the system under negative pressure, so that the cleavable amine content of the isocyanurate-containing polyisocyanate composition is less than or equal to 20 ppm based on a weight of the polyisocyanate composition.

All the pressures involved in the present application are absolute pressures.

It is found in the present application that the main factors that lead to chromaticity increment of the isocyanurate-containing polyisocyanate composition during the long-term storage process include the residual impurities in the quaternary ammonium base and/or quaternary ammonium salt catalysts, the catalyst decomposition in the process and the catalyst residues in the polyisocyanate composition, and therefore, the following beneficial effects are obtained by adopting the technical solutions.

(1) By subjecting the obtained polyisocyanate composition to heat treatment under high temperature and reduced pressure, the quaternary ammonium cations of the catalyst undergo Hofmann elimination reaction, and the organic amine obtained by pyrolysis can be removed from the system under negative pressure, so that the cleavable amine content of the polyisocyanate composition is less than or equal to 20 ppm.

(2) In some preferred embodiments, the cleavable amine content of the polyisocyanate composition can be further reduced by adding a phosphate salt into the prepolymer after terminating the reaction.

(3) The obtained isocyanurate-containing polyisocyanate composition has good storage chromaticity stability, and its chromaticity increment is less than or equal to 10 Hazen after storage at 40° C./12 months, and in a preferred embodiment, its chromaticity increment can be controlled at less than or equal to 5 Hazen.

(4) The present application has simple preparation process and broad range, and is easy to be industrialized.

DETAILED DESCRIPTION

For a detailed understanding of technical features and contents of the present application, preferred embodiments of the present application are described in more detail below. Although the preferred embodiments of the present disclosure are described through examples, it should be understood that the present application may be implemented in various manners and should not be limited to the embodiments set forth herein.

Main Raw Material Sources:
  1,6-hexamethylene diisocyanate, Wannate®HDI, Wanhua chemical;
  isophorone diisocyanate, Wannate®IPDI, Wanhua chemical;

1,3-xylylene diisocyanate, Wannate®XDI, Wanhua chemical;
1-hexanol, purity≥99%, Sigma Aldrich;
2-ethyl-1,3-hexanediol, purity≥99%, Sigma Aldridge;
tetraethylammonium hydroxide solution (25%, methanol solution), Sigma Aldridge;
hydroxypropyltrimethylammonium octanoate, Evonik Industries AG;
potassium dihydrogen phosphate, purity≥99%, Sigma Aldridge;
potassium hydrogen phosphate, purity≥99%, Sigma Aldridge;
diisooctyl phosphate, purity≥99%, Sigma Aldrich;
benzoic acid, purity≥99.5%, Sigma Aldrich.

Testing Methods:

With reference to the method of GB/T 12009.4-1989, the NCO content of the reaction system was measured by the Metrohm 905 potentiometric titrator in the present application.

With reference to the method of GB/T 3143-1982, the product was tested for the color in a 50 mm disposable rectangular cuvette by HACH Lange LICO 400 in the present application; for the solid product prepared, it needs to be dissolved in a solvent and prepared into a solution for the chromaticity test.

The dynamic viscosity in the present application is obtained by BrookField DV-I Prime Viscometer and S21 rotor at 25° C.

The free (or residual) unreacted isocyanate monomer content in the present application is tested with reference to the national standard GB/T 18446-2009, using the Agilent GC-7890B gas chromatograph manufactured by Agilent.

The cleavable amine content of the isocyanurate-containing polyisocyanate composition in the present application is tested with the GCMS-QP2010 Ultra pyrolysis-gas chromatograph-mass spectrometer of SHIMADZU Corporation by an external standard method, and the specific conditions are as follows:

pyrolyzer: Frontier 2020 iD, pyrolysis temperature: 215° C., and pyrolysis time: 60 s;

gas chromatograph-mass spectrometer: carrier gas: helium; column head pressure: 48150 kPa; split ratio: 25/1; temperature programming starting at 40° C. and holding the temperature for 2 min; rising to 200° C. at 10° C./min and holding the temperature for 4 min; then rising to 230° C. at 25° C./min and holding the temperature for 2 min; and inlet temperature: 180° C.

Main Equipments:

For the two-stage thin-film evaporator, the first-stage evaporator area is 0.1 m$^2$, and the second-stage evaporator area is 0.05 m$^2$.

Reaction kettle (i.e. reaction vessel), volume 5 L, anchor stirring paddle, and rotating diameter 100 mm.

Example 1

A preparation method of an isocyanurate-containing polyisocyanate composition includes the following steps.
(1) Preparation of a catalyst solution: 6 g of hydroxypropyltrimethylammonium octanoate was weighed out, dissolved into 14 g of 1-hexanol, and mixed uniformly to prepare an alcohol solution of hydroxypropyltrimethylammonium octanoate with a mass concentration of 30 wt %.
Under nitrogen atmosphere, 3000 g of initiating diisocyanate HDI was added into a 5 L reaction vessel and mixed, the system was heated to 60° C. under stirring, 6.0 g of the alcohol solution of hydroxypropyltrimethylammonium octanoate (30 wt %, 1-hexanol solution) was added dropwise into the system, and the NCO % of the reaction solution was determined by tracking.
(2) When the NCO % value of the reaction solution decreased to 38.5%, 3.3 g of diisooctyl phosphate was added into the system to terminate the reaction, so as to obtain a prepolymer.
(3) The obtained prepolymer was subjected to separation treatment by a two-stage thin-film evaporator, and an operating condition included a feed temperature of 80° C., a feed rate of 1 Kg/h, a first-stage separation temperature of 160° C., a first-stage absolute pressure of 80 Pa, a second-stage separation temperature of 160° C. and a second-stage absolute pressure of 10 Pa; the unreacted HDI monomer was removed to obtain a secondary separation heavy component.
(4) The secondary separation heavy component obtained in step (3) with unreacted HDI monomer removed was transferred into a negative pressure heat treatment tank, and subjected to heat treatment under high temperature and reduced pressure, and the heat treatment had a temperature of 150° C., a retention time of 30 min, and a vacuum degree of absolute pressure of 10 Pa; the isocyanurate-containing polyisocyanate composition was obtained, in which cleavable amine content (trimethylamine) 18 ppm;
viscosity: 2800 cP/25° C.;
NCO group content: 22.0 wt %;
free 1,6-hexamethylene diisocyanate content: 0.18 wt %;
chromaticity: 20 Hazen.

Example 2

A preparation method of an isocyanurate-containing polyisocyanate composition includes the following steps.
(1) Preparation of a catalyst solution: 1 g of hydroxypropyltrimethylammonium octanoate was weighed out, dissolved into 19 g of 1-hexanol, and mixed uniformly to prepare an alcohol solution of hydroxypropyltrimethylammonium octanoate with a mass concentration of 5 wt %.
Under nitrogen atmosphere, 3000 g of initiating diisocyanate HDI was added into a 5 L reaction vessel and mixed, the system was heated to 60° C. under stirring, 12.0 g of the alcohol solution of hydroxypropyltrimethylammonium octanoate (5 wt %, 1-hexanol solution) was added dropwise into the system, and the NCO % of the reaction solution was determined by tracking.
(2) When the NCO % value of the reaction solution decreased to 38.7%, 0.83 g of diisooctyl phosphate was added into the system to terminate the reaction, so as to obtain a prepolymer.
(3) The obtained prepolymer was subjected to separation treatment by a two-stage thin-film evaporator, and an operating condition included a feed temperature of 90° C., a feed rate of 1 Kg/h, a first-stage separation temperature of 160° C., a first-stage absolute pressure of 50 Pa, a second-stage separation temperature of 160° C. and a second-stage absolute pressure of 5 Pa; the unreacted HDI monomer was removed to obtain a secondary separation heavy component.
(4) The secondary separation heavy component obtained in step (3) with unreacted HDI monomer removed was transferred into a negative pressure heat treatment tank, and subjected to heat treatment under high temperature and reduced pressure, and the heat treatment had a temperature of 160° C., a retention time of 20 min, and a vacuum degree of absolute pressure of 5 Pa; the isocyanurate-containing polyisocyanate composition was obtained, in which
cleavable amine content (trimethylamine) 13 ppm;
viscosity: 2450 cP/25° C.;
NCO group content: 21.8 wt %;
free 1,6-hexamethylene diisocyanate content: 0.1 wt %;
chromaticity: 16 Hazen.

Example 3

A preparation method of an isocyanurate-containing polyisocyanate composition includes the following steps.
(1) Preparation of a catalyst solution: 3 g of a tetraethylammonium hydroxide solution (25%, methanol solution) was weighed out, dissolved into 22 g of 2-ethyl-1,3-hexanediol, and mixed uniformly to prepare an alcohol solution of tetraethylammonium hydroxide with a mass concentration of 3 wt %.
Under nitrogen atmosphere, 3000 g of initiating diisocyanate HDI was added into a 5 L reaction vessel and mixed, the system was heated to 70° C. under stirring, 8.0 g of the catalyst solution (the alcohol solution of 3 wt % tetraethylammonium hydroxide) was added dropwise into the system, and the NCO % of the reaction solution was determined by tracking.
(2) When the NCO % value of the reaction solution decreased to 38.8%, 0.7 g of diisooctyl phosphate was added into the system to terminate the reaction, so as to obtain a prepolymer.
(3) The obtained prepolymer was subjected to separation treatment by a two-stage thin-film evaporator, and an operating condition included a feed temperature of 100° C., a feed rate of 1 Kg/h, a first-stage separation temperature of 170° C., a first-stage absolute pressure of 120 Pa, a second-stage separation temperature of 170° C. and a second-stage absolute pressure of 3 Pa; the unreacted HDI monomer was removed to obtain a secondary separation heavy component.
(4) The secondary separation heavy component obtained in step (3) with unreacted HDI monomer removed was transferred into a negative pressure heat treatment tank, and subjected to heat treatment under high temperature and reduced pressure, and the heat treatment had a temperature of 180° C., a retention time of 15 min, and a vacuum degree of absolute pressure of 5 Pa; the isocyanurate-containing polyisocyanate composition was obtained, in which
cleavable amine content (triethylamine) 5 ppm;
viscosity: 2700 cP/25° C.;
NCO group content: 21.9 wt %;
free 1,6-hexamethylene diisocyanate content: 0.05 wt %;
chromaticity: 15 Hazen.

Example 4

A preparation method of an isocyanurate-containing polyisocyanate composition includes the following steps.
(1) Preparation of a catalyst solution: 3 g of a tetraethylammonium hydroxide solution (25%, methanol solution) was weighed out, dissolved into 247 g of 2-ethyl-1,3-hexanediol, and mixed uniformly to prepare an alcohol solution of tetraethylammonium hydroxide with a mass concentration of 0.3 wt %.
Under nitrogen atmosphere, 3000 g of initiating diisocyanate HDI was added into a 5 L reaction vessel and mixed, the system was heated to 70° C. under stirring, 30.0 g of the catalyst solution (the alcohol solution of 0.3 wt % tetraethylammonium hydroxide) was added dropwise into the system, and the NCO % of the reaction solution was determined by tracking.
(2) When the NCO % value of the reaction solution decreased to 38.4%, 0.11 g of benzoic acid was added into the system to terminate the reaction, so as to obtain a prepolymer.
(3) The obtained prepolymer was subjected to separation treatment by a two-stage thin-film evaporator, and an operating condition included a feed temperature of 100° C., a feed rate of 1 Kg/h, a first-stage separation temperature of 160° C., a first-stage absolute pressure of 100 Pa, a second-stage separation temperature of 180° C. and a second-stage absolute pressure of 7 Pa; the unreacted HDI monomer was removed to obtain a secondary separation heavy component.
(4) The secondary separation heavy component obtained in step (3) with unreacted HDI monomer removed was transferred into a negative pressure heat treatment tank, and subjected to heat treatment under high temperature and reduced pressure, and the heat treatment had a temperature of 180° C., a retention time of 20 min, and a vacuum degree of absolute pressure of 3 Pa; the isocyanurate-containing polyisocyanate composition was obtained, in which
cleavable amine content (triethylamine) 4 ppm;
viscosity: 2150 CP/25° C.;
NCO group content: 21.6 wt %;
free 1,6-hexamethylene diisocyanate content: 0.07 wt %;
chromaticity: 9 Hazen.

Example 5

A preparation method of an isocyanurate-containing polyisocyanate composition includes the following steps.
(1) Preparation of a catalyst solution: 3 g of a tetraethylammonium hydroxide solution (25%, methanol solution) was weighed out, dissolved into 247 g of 2-ethyl-1,3-hexanediol, and mixed uniformly to prepare an alcohol solution of tetraethylammonium hydroxide with a mass concentration of 0.3 wt %.
Under nitrogen atmosphere, 3000 g of initiating diisocyanate IPDI was added into a 5 L reaction vessel and mixed, the system was heated to 70° C. under stirring, 30.0 g of the catalyst solution (the alcohol solution of 0.3 wt % tetraethylammonium hydroxide) was added dropwise into the system, and the NCO % of the reaction solution was determined by tracking.
(2) When the NCO % value of the reaction solution decreased to 23%, 0.11 g of benzoic acid was added into the system to terminate the reaction, so as to obtain a prepolymer.
(3) The obtained prepolymer was subjected to separation treatment by a two-stage thin-film evaporator, and an operating condition included a feed temperature of 100° C., a feed rate of 1 Kg/h, a first-stage separation temperature of 180° C., a first-stage absolute pressure of 100 Pa, a second-stage separation temperature of 180° C. and a second-stage absolute pressure of 7 Pa; the unreacted IPDI monomer was removed to obtain a secondary separation heavy component.
(4) The secondary separation heavy component obtained in step (3) with unreacted IPDI monomer removed was transferred into a negative pressure heat treatment tank, and subjected to heat treatment under high temperature and reduced pressure, and the heat treatment had a temperature of 180° C., a retention time of 20 min, and a vacuum degree of absolute pressure of 3 Pa; the isocyanurate-containing polyisocyanate composition was obtained. 70 g of the obtained polyisocyanate composition (solid) was weighed out, dissolved in 30 g of butyl acetate, and prepared into a colorless transparent solution for the chromaticity test. For the polyisocyanate composition, cleavable amine content (triethylamine) 3 ppm;
viscosity: 1300 cP/25° C.;
NCO group content: 12.1 wt %;
free isophorone diisocyanate content: 0.10 wt %;
chromaticity: 12 Hazen.

Example 6

A preparation method of an isocyanurate-containing polyisocyanate composition includes the following steps.
(1) Preparation of a catalyst solution: 3 g of a tetraethylammonium hydroxide solution (25%, methanol solution) was weighed out, dissolved into 247 g of 2-ethyl-1,3-hexanediol, and mixed uniformly to prepare an alcohol solution of tetraethylammonium hydroxide with a mass concentration of 0.3 wt %.

Under nitrogen atmosphere, 3000 g of initiating diisocyanate XDI was added into a 5 L reaction vessel and mixed, the system was heated to 70° C. under stirring, 30.0 g of the catalyst solution (the alcohol solution of 0.3 wt % tetraethylammonium hydroxide) was added dropwise into the system, and the NCO % of the reaction solution was determined by tracking.
(2) When the NCO % value of the reaction solution decreased to 26%, 0.11 g of benzoic acid was added into the system to terminate the reaction, so as to obtain a prepolymer.
(3) The obtained prepolymer was subjected to separation treatment by a two-stage thin-film evaporator, and an operating condition included a feed temperature of 100° C., a feed rate of 1 Kg/h, a first-stage separation temperature of 160° C., a first-stage absolute pressure of 100 Pa, a second-stage separation temperature of 160° C. and a second-stage absolute pressure of 7 Pa; the unreacted XDI monomer was removed to obtain a secondary separation heavy component.
(4) The secondary separation heavy component obtained in step (3) with unreacted XDI monomer removed was transferred into a negative pressure heat treatment tank, and subjected to heat treatment under high temperature and reduced pressure, and the heat treatment had a temperature of 180° C., a retention time of 20 min, and a vacuum degree of absolute pressure of 3 Pa; the isocyanurate-containing polyisocyanate composition was obtained. 75 g of the obtained polyisocyanate composition (solid) was weighed out, dissolved in 25 g of ethyl acetate, and prepared into a colorless transparent solution for the chromaticity test. For the polyisocyanate composition, cleavable amine content (triethylamine) 4 ppm;
viscosity: 1300 cP/25° C.;
NCO group content: 14.1 wt %;
free 1,3-xylylene diisocyanate content: 0.10 wt %;
chromaticity: 10 Hazen.

Example 7

A preparation method of an isocyanurate-containing polyisocyanate composition includes the following steps.
(1) Preparation of a catalyst solution: 3 g of a tetraethylammonium hydroxide solution (25%, methanol solution) was weighed out, dissolved into 247 g of 2-ethyl-1,3-hexanediol, and mixed uniformly to prepare an alcohol solution of tetraethylammonium hydroxide with a mass concentration of 0.3 wt %.

Under nitrogen atmosphere, 3000 g of initiating diisocyanate HDI was added into a 5 L reaction vessel and mixed, the system was heated to 70° C. under stirring, 30.0 g of the catalyst solution (the alcohol solution of 0.3 wt % tetraethylammonium hydroxide) was added dropwise into the system, and the NCO % of the reaction solution was determined by tracking.
(2) When the NCO % value of the reaction solution decreased to 38.5%, 0.11 g of benzoic acid was added into the system to terminate the reaction, so as to obtain a prepolymer;

40.0 mg of potassium dihydrogen phosphate was added into the prepolymer, stirred thoroughly at 0° C. for 120 min, and the filtered by a 1 μm filter element.
(3) The filtered prepolymer was subjected to separation treatment by a two-stage thin-film evaporator, and an operating condition included a feed temperature of 100° C., a feed rate of 1 Kg/h, a first-stage separation temperature of 160° C., a first-stage absolute pressure of 100 Pa, a second-stage separation temperature of 180° C. and a second-stage absolute pressure of 7 Pa; the unreacted HDI monomer was removed to obtain a secondary separation heavy component.
(4) The secondary separation heavy component obtained in step (3) with unreacted HDI monomer removed was transferred into a negative pressure heat treatment tank, and subjected to heat treatment under high temperature and reduced pressure, and the heat treatment had a temperature of 180° C., a retention time of 20 min, and a vacuum degree of absolute pressure of 3 Pa; the isocyanurate-containing polyisocyanate composition was obtained, in which the cleavable amine content: undetected;
viscosity: 2180 cP/25° C.;
NCO groupcontent: 21.7 wt %;
free 1,6-hexamethylene diisocyanate content: 0.08 wt %;
chromaticity: 8 Hazen.

Example 8

A preparation method of an isocyanurate-containing polyisocyanate composition includes the following steps.
(1) Preparation of a catalyst solution: 3 g of a tetraethylammonium hydroxide solution (25%, methanol solution) was weighed out, dissolved into 247 g of 2-ethyl-1,3-hexanediol, and mixed uniformly to prepare an alcohol solution of tetraethylammonium hydroxide with a mass concentration of 0.3 wt %.

Under nitrogen atmosphere, 3000 g of initiating diisocyanate HDI was added into a 5 L reaction vessel and mixed, the system was heated to 70° C. under stirring, 30.0 g of the catalyst solution (the alcohol solution of 0.3 wt % tetraethylammonium hydroxide) was added dropwise into the system, and the NCO % of the reaction solution was determined by tracking.
(2) When the NCO % value of the reaction solution decreased to 38.5%, 0.11 g of benzoic acid was added into the system to terminate the reaction, so as to obtain a prepolymer;

54.0 mg of potassium dihydrogen phosphate was added into the prepolymer, stirred thoroughly at 30° C. for 15 min, and filtered by a 1 μm filter element.

(3) The filtered prepolymer was subjected to separation treatment by a two-stage thin-film evaporator, and an operating condition included a feed temperature of 100° C., a feed rate of 1 Kg/h, a first-stage separation temperature of 160° C., a first-stage absolute pressure of 100 Pa, a second-stage separation temperature of 180° C. and a second-stage absolute pressure of 7 Pa; the unreacted HDI monomer was removed to obtain a secondary separation heavy component.

(4) The secondary separation heavy component obtained in step (3) with unreacted HDI monomer removed was transferred into a negative pressure heat treatment tank, and subjected to heat treatment under high temperature and reduced pressure, and the heat treatment had a temperature of 180° C., a retention time of 20 min, and a vacuum degree of absolute pressure of 3 Pa; the isocyanurate-containing polyisocyanate composition was obtained, in which cleavable amine content: undetected;
viscosity: 2200 cP/25° C.;
NCO group content: 21.8 wt %;
free 1,6-hexamethylene diisocyanate content: 0.10 wt %;
chromaticity: 8 Hazen.

Comparative Example 1

A preparation method of an isocyanurate-containing polyisocyanate composition includes the following steps.

(1) Preparation of a catalyst solution: 6 g of hydroxypropyltrimethylammonium octanoate was weighed out, dissolved into 14 g of 1-hexanol, and mixed uniformly to prepare an alcohol solution of hydroxypropyltrimethylammonium octanoate with a mass concentration of 30 wt %.

Under nitrogen atmosphere, 3000 g of initiating diisocyanate HDI was added into a 5 L reaction vessel and mixed, the system was heated to 60° C. under stirring, 6.0 g of the alcohol solution of hydroxypropyltrimethylammonium octanoate (30 wt %, 1-hexanol solution) was added dropwise into the system, and the NCO % of the reaction solution was determined by tracking.

(2) When the NCO % value of the reaction solution decreased to 38.6%, 3.3 g of diisooctyl phosphate was added into the system to terminate the reaction, so as to obtain a prepolymer.

(3) The obtained prepolymer was subjected to separation treatment by a two-stage thin-film evaporator, and an operating condition included a feed temperature of 80° C., a feed rate of 1 Kg/h, a first-stage separation temperature of 160° C., a first-stage absolute pressure of 80 Pa, a second-stage separation temperature of 160° C. and a second-stage absolute pressure of 10 Pa; the unreacted HDI monomer was removed to obtain a secondary separation heavy component, namely, the isocyanurate-containing polyisocyanate composition, in which cleavable amine content (trimethylamine) 63 ppm;
viscosity: 2790 cP/25° C.;
NCO group content: 22.0 wt %;
free 1,6-hexamethylene diisocyanate content: 0.16 wt %;
chromaticity: 19 Hazen.

Comparative Example 2

A preparation method of an isocyanurate-containing polyisocyanate composition includes the following steps.

(1) Preparation of a catalyst solution: 6 g of hydroxypropyltrimethylammonium octanoate was weighed out, dissolved into 14 g of 1-hexanol, and mixed uniformly to prepare an alcohol solution of hydroxypropyltrimethylammonium octanoate with a mass concentration of 30 wt %.

Under nitrogen atmosphere, 3000 g of initiating diisocyanate HDI was added into a 5 L reaction vessel and mixed, the system was heated to 60° C. under stirring, 6.0 g of the alcohol solution of hydroxypropyltrimethylammonium octanoate (30 wt %, 1-hexanol solution) was added dropwise into the system, and the NCO % of the reaction solution was determined by tracking.

(2) When the NCO % value of the reaction solution decreased to 38.5%, 3.3 g of diisooctyl phosphate was added into the system to terminate the reaction, so as to obtain a prepolymer.

(3) The obtained prepolymer was subjected to separation treatment by a two-stage thin-film evaporator, and an operating condition included a feed temperature of 80° C., a feed rate of 1 Kg/h, a first-stage separation temperature of 160° C., a first-stage absolute pressure of 80 Pa, a second-stage separation temperature of 160° C. and a second-stage absolute pressure of 10 Pa; the unreacted HDI monomer was removed to obtain a secondary separation heavy component.

(4) The secondary separation heavy component obtained in step (3) with unreacted HDI monomer removed was transferred into a negative pressure heat treatment tank, and subjected to heat treatment, and the heat treatment had a temperature of 70° C., a retention time of 20 min, and a vacuum degree of absolute pressure of 10 Pa; the isocyanurate-containing polyisocyanate composition was obtained, in which cleavable amine content (trimethylamine) 62 ppm;
viscosity: 2800 cP/25° C.;
NCO group content: 22.0 wt %;
free 1,6-hexamethylene diisocyanate content: 0.15 wt %;
chromaticity: 20 Hazen.

Comparative Example 3

A preparation method of an isocyanurate-containing polyisocyanate composition includes the following steps.

(1) Preparation of a catalyst solution: 6 g of hydroxypropyltrimethylammonium octanoate was weighed out, dissolved into 14 g of 1-hexanol, and mixed uniformly to prepare an alcohol solution of hydroxypropyltrimethylammonium octanoate with a mass concentration of 30 wt %.

Under nitrogen atmosphere, 3000 g of initiating diisocyanate HDI was added into a 5 L reaction vessel and mixed, the system was heated to 60° C. under stirring, 6.0 g of the alcohol solution of hydroxypropyltrimethylammonium octanoate (30 wt %, 1-hexanol solution) was added dropwise into the system, and the NCO % of the reaction solution was determined by tracking.

(2) When the NCO % value of the reaction solution decreased to 38.5%, 3.3 g of diisooctyl phosphate was added into the system to terminate the reaction, so as to obtain a prepolymer.

(3) The obtained prepolymer was subjected to separation treatment by a two-stage thin-film evaporator, and an operating condition included a feed temperature of 80° C., a feed rate of 1 Kg/h, a first-stage separation temperature of 160° C., a first-stage absolute pressure of 80 Pa, a second-stage separation temperature of 160°

C. and a second-stage absolute pressure of 10 Pa; the unreacted HDI monomer was removed to obtain a secondary separation heavy component.

(4) The secondary separation heavy component obtained in step (3) with unreacted HDI monomer removed was transferred into a negative pressure heat treatment tank, and subjected to heat treatment, and the heat treatment had a temperature of 150° C., a retention time of 30 min, and a vacuum degree of absolute pressure of 500 Pa; the isocyanurate-containing polyisocyanate composition was obtained, in which cleavable amine content (trimethylamine) 60 ppm;
viscosity: 2820 cP/25° C.;
NCO group content: 21.9 wt %;
free 1,6-hexamethylene diisocyanate content: 0.18 wt %;
chromaticity: 23 Hazen.

Example 9

The isocyanurate-containing polyisocyanate compositions prepared in Examples 1-8 and Comparative Examples 1-3 were weighed out by 800 g separately and placed into 1 kg plastic bottles lined with polytetrafluoroethylene, the sample bottles were purged with $N_2$ and then sealed, and stored in an oven at 40° C. for 12 months. The samples that had completed the storage process were tested for the chromaticity, and the results are shown in Table 1.

TABLE 1

Chromaticity stability test results

| Items | Cleavable Amine Content | Initiating Color/Hazen | Color after Storage at 40° C. for 12 months/Hazen |
|---|---|---|---|
| Example 1 | 18 ppm | 20 | 27 |
| Example 2 | 13 ppm | 16 | 21 |
| Example 3 | 5 ppm | 15 | 16 |
| Example 4 | 4 ppm | 9 | 12 |
| Example 5 | 3 ppm | 12 | 13 |
| Example 6 | 4 ppm | 10 | 12 |
| Example 7 | Undetected | 8 | 8 |
| Example 8 | Undetected | 8 | 8 |
| Comparative Example 1 | 63 ppm | 19 | 39 |
| Comparative Example 2 | 62 ppm | 20 | 42 |
| Comparative Example 3 | 60 ppm | 23 | 49 |

It can be seen from the chromaticity stability test results in Table 1 that the storage color stability of the isocyanurate-containing polyisocyanate composition is effectively improved by reducing the cleavable amine content of the polyisocyanate composition, and the chromaticity increment of the polyisocyanate compositions after stored at 40° C. for 12 months is controlled at less than 10 Hazen. When the process conditions of heat treatment are in the preferred ranges, the higher the heat treatment temperature and the lower the heat treatment vacuum degree, the lower the cleavable amine content in the composition after heat treatment, and the better the color stability after storage.

It can be seen from the test data of Example 4 and Examples 7-8 that, before subjecting the crude polyisocyanate composition to the heat treatment under high temperature and low vacuum degree, adding a phosphate salt into the prepolymer can further reduce the cleavable amine content of the obtained polyisocyanate composition, and can further improve the color stability of the sample after stored at 40° C. for 12 months.

It can be seen from the test data of Example 1 and Comparative Example 1 that, after the heat treatment under high temperature and low vacuum degree, the cleavable amine content of the obtained polyisocyanate composition is significantly reduced, and the color stability of the sample after stored at 40° C. for 12 months is significantly improved.

It can be seen from the test data of Example 1 and Comparative Examples 2-3 that, in the case where the process conditions of heat treatment are in the preferred ranges, it will be ensured that the treated composition has low cleavable amine content and good color stability after storage at months. However, if the process conditions of heat treatment fail to meet the requirements, the cleavable amine content of the composition cannot be reduced, and the color stability after storage at 40° C./12 months cannot be improved.

Some embodiments of the present application have been described above, and the above description is not exhaustive but merely illustrative, and not limited to the disclosed embodiments. Many modifications and variations will be obvious to those skilled in the art without departing from the scope and spirit of the illustrated embodiments.

What is claimed is:

1. A preparation method for an isocyanurate-containing polyisocyanate composition with stable chromaticity, comprising the following steps:
   (1) reacting an isocyanate monomer in the presence of the catalyst;
   (2) adding a terminator into the system to terminate the reaction when the reaction reaches a target conversion rate, so as to obtain a prepolymer;
   (3) subjecting the product obtained in step (2) to separation treatment to remove the unreacted isocyanate monomer to obtain a crude isocyanurate-containing polyisocyanate composition; and
   (4) subjecting the crude polyisocyanate composition obtained in step (3) to heat treatment under high temperature and reduced pressure to obtain the isocyanurate-containing polyisocyanate composition with stable chromaticity;
   wherein step (2) further comprises adding a phosphate salt into the prepolymer after terminating the reaction;
   based on a total weight of the polyisocyanate composition, a cleavable amine content of the polyisocyanate composition is less than or equal to 20 ppm; the cleavable amine is a decomposition product of a catalyst used in preparing the isocyanurate-containing polyisocyanate composition.

2. The preparation method according to claim 1, wherein the phosphate salt is selected from one or more of potassium dihydrogen phosphate, sodium dihydrogen phosphate, potassium hydrogen phosphate and sodium hydrogen phosphate;
   and/or a hydrogen molar amount in the phosphate salt is 50-100% of a catalyst molar amount;
   and/or step (2) comprises stirring at 0-30° C. for 10-120 min after adding the phosphate salt.

3. The preparation method according to claim 1, wherein the catalyst in step (1) is added in a form of an alcohol solution;
   and/or an amount of the catalyst is 0.001%-0.1% of a mass of the isocyanate monomer.

4. The preparation method according to claim 1, wherein the isocyanate monomer in step (1) is an aromatic or aliphatic diisocyanate containing an NCO group and 4-20 carbon atoms.

5. The preparation method according to claim 1, wherein the terminator in step (2) is selected from an organic acid and/or an acylating agent;

and/or an amount of the terminator is 100-150% of a catalyst molar amount.

6. The preparation method according to claim 1, wherein in step (3), the product obtained in step (2) is subjected to the separation treatment by a thin-film evaporator to remove the unreacted isocyanate monomer.

7. The preparation method according to claim 1, wherein in step (4), a process condition of the heat treatment of the crude polyisocyanate composition under high temperature and reduced pressure comprises treating the composition at a temperature of 90-180° C. and a pressure of less than or equal to 200 Pa for 5-60 min.

8. The preparation method according to claim 1, wherein the catalyst is a quaternary ammonium base and/or a quaternary ammonium salt.

9. The preparation method according to claim 1, wherein the cleavable amine is one or more of trimethylamine, triethylamine, tripropylamine and tributylamine.

10. The preparation method according to claim 1, wherein the catalyst is selected from one or more of choline hydroxide, (2-hydroxyethyl) trimethylammonium hydroxide, tetramethylammonium hydroxide, tetraethylammonium hydroxide, tetrapropylammonium hydroxide, tetrabutylammonium hydroxide, benzyltrimethylammonium hydroxide, 1-adamantylammonium hydroxide, hexamethonium hydroxide, a tetraalkylammonium salt of organic weak acid, hydroxypropyltrimethylammonium formate, hydroxypropyltrimethylammonium acetate, hydroxypropyltrimethylammonium octanoate, hydroxypropyltrimethylammonium decanoate, hydroxyethyltrimethylammonium formate, hydroxyethyltrimethylammonium acetate and hydroxyethyltrimethylammonium decanoate.

11. The preparation method according to claim 1, wherein after stored at 40° C. for 12 months, the polyisocyanate composition has a chromaticity increment of less than or equal to 10 Hazen.

12. The preparation method according to claim 3, wherein a mass concentration of the catalyst is 0.25%-50% in the alcohol solution.

13. The preparation method according to claim 4, wherein the isocyanate monomer is selected from one or more of hexamethylene diisocyanate, isophorone diisocyanate, cyclohexyl dimethylene diisocyanate, xylylene diisocyanate, dicyclohexylmethane diisocyanate, norbornane dimethylene diisocyanate, cyclohexyl diisocyanate, lysine diisocyanate, tetramethyl xylylene diisocyanate, 2,4,4-trimethylhexamethylene diisocyanate, toluene diisocyanate, methylcyclohexyl diisocyanate, naphthalene diisocyanate, p-phenylene diisocyanate and diphenylmethane diisocyanate.

14. The preparation method according to claim 5, wherein the terminator in step (2) is selected from one or more of formic acid, benzoic acid, benzoyl chloride and diisooctyl phosphate.

15. The preparation method according to claim 7, wherein in step (4), a process condition of the heat treatment of the crude polyisocyanate composition under high temperature and reduced pressure comprises treating the composition at a temperature of 150-180° C. and a pressure of less than or equal to 20 Pa for 10-30 min.

* * * * *